(12) United States Patent
Beck

(10) Patent No.: US 12,556,073 B2
(45) Date of Patent: Feb. 17, 2026

(54) ROTOR AND METHOD FOR PRODUCING A ROTOR

(71) Applicant: Bayerische Motoren Werke Aktiengesellschaft, Munich (DE)

(72) Inventor: Florian Beck, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 179 days.

(21) Appl. No.: 18/282,578

(22) PCT Filed: Apr. 26, 2022

(86) PCT No.: PCT/EP2022/061016
§ 371 (c)(1),
(2) Date: Sep. 18, 2023

(87) PCT Pub. No.: WO2022/242990
PCT Pub. Date: Nov. 24, 2022

(65) Prior Publication Data
US 2024/0186872 A1    Jun. 6, 2024

(30) Foreign Application Priority Data

May 21, 2021  (DE) ............... 10 2021 113 309.2

(51) Int. Cl.
*H02K 15/12*  (2025.01)
*H02K 3/32*  (2006.01)
(Continued)

(52) U.S. Cl.
CPC ............. *H02K 19/02* (2013.01); *H02K 3/487* (2013.01); *H02K 15/026* (2013.01); *H02K 15/12* (2013.01)

(58) Field of Classification Search
CPC ........ H02K 15/12; H02K 15/13; H02K 3/487; H02K 15/10; H02K 3/527; H02K 3/32
(Continued)

(56) References Cited

U.S. PATENT DOCUMENTS 2,914,600 A * 11/1959 Smith ............... H01F 38/12
156/169
7,096,566 B2 * 8/2006 Du ................... H02K 3/30
29/733

(Continued)

FOREIGN PATENT DOCUMENTS

DE  10 2011 121 793 A1   6/2013
DE  10 2016 205 813 A1   10/2017
(Continued)

OTHER PUBLICATIONS

International Search Report (PCT/ISA/210) issued in PCT Application No. PCT/EP2022/061016 dated Aug. 26, 2022 with English translation (4 pages).
(Continued)

*Primary Examiner* — Burton S Mullins
(74) *Attorney, Agent, or Firm* — Crowell & Moring LLP

(57) ABSTRACT

A rotor for a current-excited synchronous machine, includes a rotor main body which has a plurality of rotor teeth distributed around the circumference and rotor slots formed therebetween, the rotor teeth being wound, along the rotor slots and on the front side, with conductor material in order to form a winding, the conductor material being surrounded by a potting compound, thereby forming a potting body for mechanical stabilization, the potting body having segments on the front sides in extension of the rotor slots, and in at least one of the segments the material cohesion of the potting compound is selectively weakened or eliminated at least in regions or portions.

9 Claims, 1 Drawing Sheet

(51) Int. Cl.
  *H02K 3/487* (2006.01)
  *H02K 15/026* (2025.01)
  *H02K 15/13* (2025.01)
  *H02K 19/02* (2006.01)

(58) Field of Classification Search
  USPC .............................. 264/39; 310/194, 214, 43
  See application file for complete search history.

(56) References Cited

U.S. PATENT DOCUMENTS

| | | | |
|---|---|---|---|
| 8,604,661 B2 * | 12/2013 | Weber | H02K 3/51 |
| | | | 310/214 |
| 9,685,833 B2 * | 6/2017 | Bulatow | H02K 3/34 |
| 2019/0199156 A1 | 6/2019 | Bernreuther et al. | |
| 2021/0367461 A1 * | 11/2021 | Barti | H02K 15/10 |
| 2024/0162775 A1 * | 5/2024 | Lang | H02K 15/12 |

FOREIGN PATENT DOCUMENTS

| | | |
|---|---|---|
| DE | 10 2017 223 519 B3 | 10/2018 |
| DE | 10 2017 222 610 A1 | 6/2019 |
| DE | 10 2018 204 395 A1 | 9/2019 |
| EP | 2 662 956 A1 | 11/2013 |

OTHER PUBLICATIONS

German-language Written Opinion (PCT/ISA/237) issued in PCT Application No. PCT/EP2022/061016 dated Aug. 26, 2022 with English translation (11 pages).

German-language Search Report issued in German Application No. 10 2021 113 309.2 dated Feb. 24, 2022 with English translation (13 pages).

Kalweit et al., "Handbuch fuer Technisches Produktdesign", Material und Fertigung—Entscheidungsgrundlagen fuer Designer und Ingenieure, 2012., pp. 1-13, (13 pages).

\* cited by examiner

ROTOR AND METHOD FOR PRODUCING A ROTOR

FIELD

The present invention relates to a rotor, in particular for an externally excited or current-excited synchronous machine, as well as a method for producing a rotor, in particular for an externally excited or current-excited synchronous machine.

BACKGROUND AND SUMMARY

The mechanical stabilization of rotor windings is a significant challenge in the development and production of electrical machines, such as for example current-excited or externally excited electrical machines. In this context, DE 10 2016 205 813 A1 proposes a method for producing a rotor, wherein a rotor laminated core is introduced with the wound rotor windings into a casting mold and overmolded with plastic compound. It has been shown that in reality there is the risk that the plastic compound cracks. This can occur during cooling but also primarily during operation, at high and very high rotational speeds. In particular, it can lead to problems if the cracks occur in the region of the winding heads of the winding.

It is thus an object of the present invention to specify a rotor and a method for producing a rotor, wherein the known method is intended to be optimized and, in particular, rotors which meet the highest quality requirements are intended to be specified.

This object is achieved by a rotor and by a method according to the present disclosure. Further advantages and features are also found in the description and the accompanying figures.

According to the invention a rotor, in particular for a current-excited/externally excited electrical machine, in particular a synchronous machine, comprises a rotor main body which has a plurality of rotor teeth distributed around the circumference and rotor slots formed therebetween, wherein the rotor teeth are wound, along the rotor slots and on the front side, with conductor material in order to form a winding, wherein the conductor material, for mechanical stabilization, is surrounded by potting compound, thereby forming a potting body, wherein the potting body has segments on the front sides in extension of the rotor slots, and wherein in at least one of the segments the material cohesion of the potting compound is selectively weakened or eliminated at least in regions or portions. It has been shown that the object does not have to be that of configuring a potting body such that it never has or forms any cracks, or the like. Rather, it has been shown to be advantageous to provide regions in which cracks and the like are selectively permitted. Thus the regions in which cracks are intended to be prevented as far as possible can be protected. In other words, advantageously no more damage/cracks occur at that point. The critical regions, in particular, are the front-side regions of the potting body which surround the winding heads in the region or in the extension of the rotor teeth. However, the front-side regions in the extension of the rotor slots and the regions in the rotor slots are non-critical. Thus it has been shown that the potting body does not crack in the region of the rotor slots. If cracks occur in the potting body in the extension of the rotor slots and axially widen these rotor slots, i.e. along the rotor axis, they do not come into contact with the winding or the conductor material. Since a material weakening or material elimination is thus selectively permitted in the front-side regions or segments which are formed in the extension of the rotor slots, the segments located therebetween, as it were in the extension of the rotor teeth, can be protected in each case.

The rotor main body is preferably a laminated rotor core comprising a plurality of laminations which are packaged to form the laminated core.

As mentioned above, the rotor is, in particular, a rotor for a current-excited/externally excited synchronous machine, wherein the invention is not specifically limited to this type of motor. Preferably, the electrical machine is a drive motor or traction motor for a partially or fully electrically operated motor vehicle, such as in particular a motorcycle, a passenger motor vehicle or even a utility vehicle.

According to preferred embodiments, the potting compound is a thermosetting resin or a thermoplastic. The potting compound is preferably applied by means of injection-molding or even by means of casting, such as for example (vacuum) pressure gelation. The potting body is expediently shaped such that it at least substantially fully envelops or encloses the rotor slots and the front-side regions of the rotor on which the winding heads are configured. In particular, the potting body is intended to cover the conductor material as fully as possible.

According to a preferred embodiment, the conductor material is, in particular, copper wire. In the present case, it is intended to be prevented that any cracks extend as far as the winding, i.e. the copper wire. Since an elimination/ weakening of the material cohesion of the potting compound or the potting body is selectively permitted in the region of the segments which are configured in the extension of the rotor slots and on the front side, it can be effectively prevented that any cracks continue as far as the winding.

According to a preferred embodiment, in the segments, in particular on both front sides of the rotor, the material cohesion of the potting compound is selectively weakened or eliminated at least in regions or portions.

According to a preferred embodiment, in the region of the at least one segment or in the region of the segments the rotor has a structure which is designed to bring about or to generate the weakening or elimination of the material cohesion. Expediently, the rotor is correspondingly shaped in some portions, or has components which are shaped, such that the material weakening or material elimination can be generated in the potting compound.

According to one embodiment, as already indicated above, the material weakening or material elimination is configured as a substantially radially extending crack. Such a radially extending crack can widen axially without resulting in any problems. The reason for this is that the crack would widen in the rotor slot where there is no conductor material in any case.

According to one embodiment, the structure comprises at least one edge, corner and/or radius which is oriented radially inwardly and/or outwardly. The structure is thus, in particular, a structural/technical design of the rotor in the region of the segments. The actual design can be selected on a case-by-case basis.

According to a preferred embodiment, the structure is configured, for example, on a slot-closing wedge, also called the slot cover, wherein the slot-closing wedge or the slot cover protrudes axially into the at least one segment or into the segments. The slot-closing wedge or the slot cover is designed such that in each case it can generate the material weakening or material elimination on the front side in the extension of the rotor slots. According to one embodiment, to this end the slot-closing wedge or the slot cover has a radially inwardly oriented structure, in particular a sharp edge or point or a correspondingly small radius.

According to one embodiment, the rotor main body is overmolded or cast, in particular with plastics, in order to form a casing and wherein the structure is configured on the casing. The casing is expediently provided for arranging and, in particular, for guiding the conductor elements or the conductor material, in particular the copper wires. Preferably, a structure for the material weakening or material elimination can be generated or configured directly via the casing. To this end, according to a preferred embodiment the casing has a correspondingly small radius, a point or a corner which is oriented radially outwardly, such that the material weakening or material elimination can be brought about in the region of the segment or the segments.

According to one embodiment, in the region of the at least one segment or in the region of the segments the potting body is configured to be thin at least in some portions or in some regions such that a material weakening, in particular in the form of a predetermined breaking point, is formed. In particular, when viewed along the rotor axis, the potting body is configured to be correspondingly thin at least in some regions or in some portions.

According to a preferred embodiment, the predetermined breaking point is formed indirectly via a cover element arranged on the front side on the rotor. Preferably, such cover elements are arranged at both ends of the rotor main body. Due to the geometry of the aforementioned casing and/or a design of the cover element, the potting body can be selectively configured to be thin in the desired segments such that the corresponding point cracks, whether for example already during the cooling of the potting compound or during the operation, in particular during the set-up, of the rotor.

Such cover elements are typically already arranged on the rotor or on the rotor main body before the potting body is generated. Such cover elements can also be designed such that the potting compound penetrates via the cover elements.

According to one embodiment, a material weakening can be generated in the potting body via the structure or by means of corresponding structures. Alternatively or additionally, the potting body already has the material weakening as such (or a plurality thereof). According to one embodiment, a material weakening is mechanically incorporated into the potting compound or into the potting body, for example in the form of a notch.

According to the invention, a method for producing a rotor, in particular for a current-excited/externally excited electrical machine, in particular a synchronous machine, comprises the steps:
  providing a rotor main body, comprising a plurality of rotor teeth distributed around the circumference and rotor slots formed therebetween;
  the rotor teeth being wound with conductor material in order to form a winding;
  applying potting compound onto the conductor material in order to form a potting body for the mechanical stabilization of the winding, wherein on the front side the potting body forms or has segments in the extension of the rotor slots;
  in at least one of the segments selectively eliminating the material cohesion of the potting compound in some regions or in some portions.

At this point it should be mentioned that the advantages and features mentioned in connection with the rotor equally apply to the method, and also vice versa.

The material cohesion is expediently eliminated by selectively introducing a structure which brings about the cracking of the potting compound. The rotor is expediently shaped or configured in the region of the segment or the segments such that the cracking of the potting compound can be brought about, wherein preferred embodiments are, in particular, correspondingly designed edges, radii or corners. It is significant that the structure or the structures are selectively incorporated such that any potential cracks do not occur randomly but specifically at the regions provided therefor. If the cracks are produced in the regions provided therefor, it can be assumed therefrom that no (more) cracks will be produced in the remaining regions.

According to one embodiment, a material weakening is incorporated in the potting compound itself, for example in the form of a reduction in the wall thickness in some regions or in the form of a notch. This can be incorporated mechanically and/or formed when the potting compound is generated.

According to one embodiment, the cracking or the material separation/elimination takes place during the cooling of the potting compound, for example by thermally induced stresses, and expediently also during start-up or during operation. During operation, for example, the stress due to the temperature and/or the rotational speed is such that the cracking is induced.

According to one embodiment, the cracks are generated during the cooling of the potting compound from the curing temperature of the potting compound to room temperature. The curing temperature is approximately 180 to 200° C., in particular 190° C.

Further advantages and features are found in the following description of embodiments of rotors with reference to the accompanying figures. The features of the individual embodiments can be combined together within the scope of the invention.

DETAILED DESCRIPTION

Figure 1:
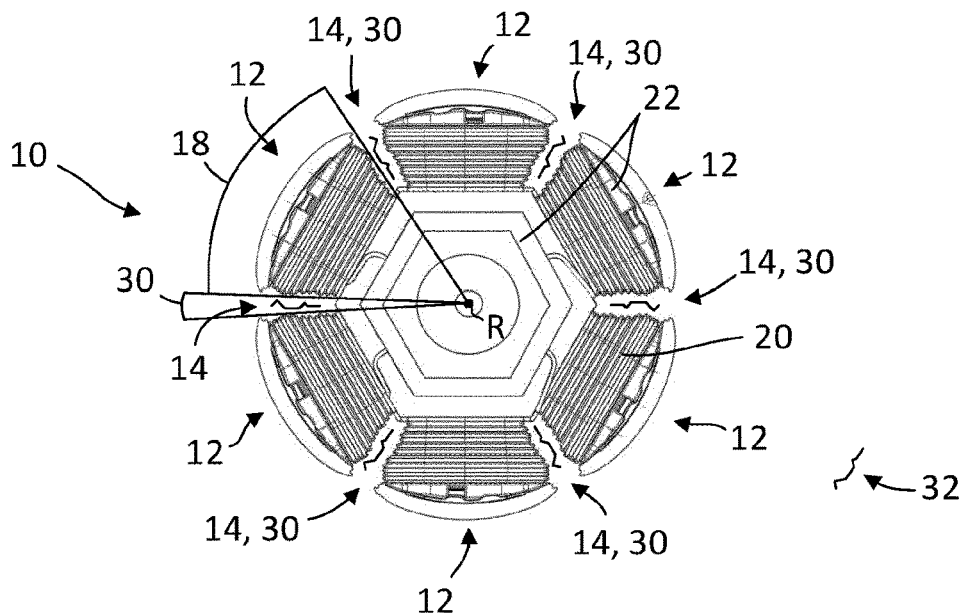
FIG. 1 shows a front-side view of an embodiment of a rotor.

FIG. 1 shows a rotor 10, when viewed along a rotor axis R. The rotor 10 extends, as it were, into the drawing plane. In the present case, the rotor 10 has six rotor teeth 12, with rotor slots 14 configured therebetween. Conductor material 20, such as for example copper wire, is wound around the rotor teeth 12. An arrangement as outlined here is expediently overmolded or cast with potting compound, wherein the potting compound fills up the rotor slots 14 and in each case also covers or envelops the conductor material 20 on the front side. In the present case, the potting compound or the potting body formed thereby is not shown. It is important that as far as possible the potting compound does not crack in the region of the winding heads and in the extension of the rotor teeth 12. In the present case, this region is outlined as the critical region 18. For reasons of clarity, only one such region is highlighted/outlined. In the present case, such a critical region is located on each of the rotor teeth 12. It has been shown that a material weakening or material elimination, in particular one or more cracks in regions in the extension of the rotor slots 14, in the present case called a segment or segments 30, can result in no cracks being produced in the critical regions 18. Since cracks are permitted in the segments 30, cracks can be advantageously avoided in the critical regions 18. In the present case, the material weakenings or cracks 32 are shown as a jagged line. The material weakenings or cracks expediently extend in a radial manner or radially in the respective segments 30. A casing 22 which expediently encases or encloses a rotor main body is outlined with the reference sign 22. Expediently, the conductor material 20 bears against the casing.

Figure 2:
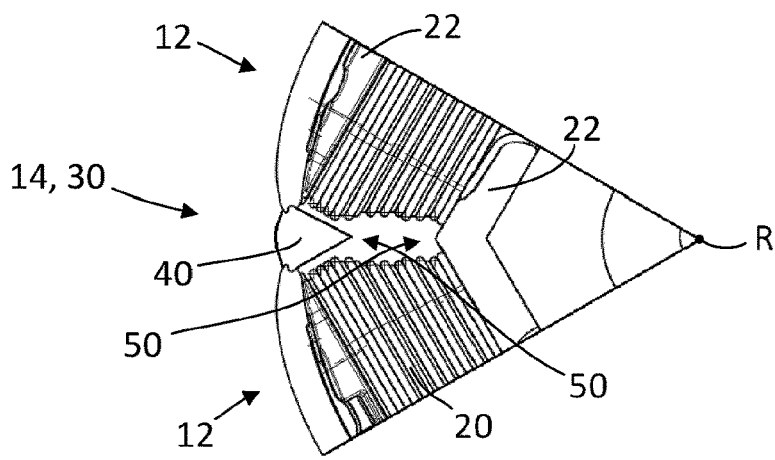
FIG. 2 shows a detailed view of a rotor.

FIG. 2 now shows a detailed view of a rotor, wherein it is possible to identify two rotor teeth with a rotor slot 14 configured therebetween. The reference sign R denotes a rotor axis and the reference sign 22 denotes a casing of a rotor main body. In the present case, the rotor slot 14 is defined outwardly via a slot cover or slot-closing wedge 40. Expediently, a structure 50 in the form of a radially inwardly oriented edge is configured thereon. This edge is designed and provided in order to generate selectively a material weakening or material elimination in the region of a segment 30. Additionally or alternatively, the casing 22, as outlined here, can also have a correspondingly configured edge which in the present case is correspondingly oriented radially outwardly. Such structures or structural/geometric features selectively permit in some regions or in some portions the elimination of the material cohesion of the potting compound in the segment 30 or in the region of a segment 30. The elimination of the material cohesion can already take place during the cooling of the potting compound, due to the stresses which occur, and/or even during operation or in particular when starting up the rotor. Expediently, the material weakening is configured in the extension of the rotor slots 14, i.e. on the front side on the rotor main body, in particular in the region of the winding heads. To this end, expediently the slot-closing wedge 40 correspondingly protrudes over the rotor main body in both directions. The actual design has to be selected on a case-by-case basis.

Figure 3:
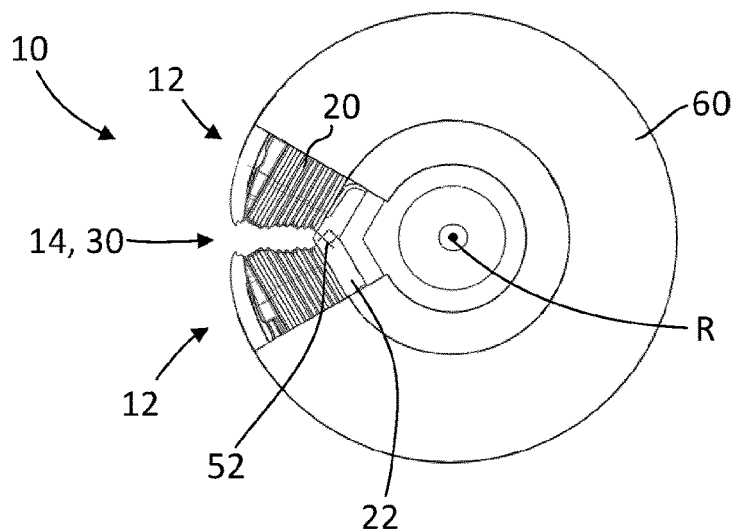
FIG. 3 shows a further embodiment of a rotor with a partially sectionally shown cover element.

FIG. 3 shows a further embodiment of a rotor 10, wherein here a cover element 60 is arranged on the front side on the rotor main body. Moreover, the essential technical features are disclosed in FIGS. 1 and 2. In the present case, a predetermined breaking point 52 is generated selectively via a casing 22 and the cover element 60. Expediently, due to the design of the casing 22 and/or the design of the cover element 60, the potting body is configured to be thin in the region of the reference sign 52 such that the potting compound cracks at that point. The background is that expediently a crack is produced in the radial direction in the region of the segment 30. It can be clearly identified that a crack which is produced here and which widens axially does not come into contact with the winding. If a crack were to be produced on the front side in the region of the rotor teeth 12, this crack, if it were to widen in the axial direction, would come into contact with the winding, which has to be avoided at all costs.

LIST OF REFERENCE SIGNS

10 Rotor
12 Rotor tooth
14 Rotor slot
16 Rotor shaft
18 Critical region
20 Conductor (material), copper wire
22 Casing
30 Segment, non-critical region
32 Material weakening, crack
40 Slot cover, slot-closing wedge
50 Structure
52 Predetermined breaking point
60 Cover element
R Rotor axis

The invention claimed is:

1. A rotor for a current-excited synchronous machine, comprising:
   a rotor main body, which comprises a plurality of rotor teeth distributed around a circumference, and rotor slots formed therebetween,
   wherein the rotor teeth are wound, along the rotor slots and on the front side, with conductor material in order to form a winding,
   wherein the conductor material is surrounded by a potting compound, thereby forming a potting body for mechanical stabilization,
   wherein the potting body has segments on front sides in extension of the rotor slots,
   wherein, in at least one of the segments, a material cohesion of the potting compound is weakened or the potting compound is eliminated, and
   wherein the weakening or elimination is configured as a substantially radially extending crack.

2. The rotor according to claim 1,
   wherein, in the region of the at least one segment, the rotor has a structure which is configured to bring about or to generate the weakening or elimination of the material cohesion.

3. The rotor according to claim 2, wherein the structure of the rotor comprises at least one edge, corner, and/or radius which is oriented radially inwardly and/or outwardly.

4. The rotor according to claim 2, wherein the structure is configured as a slot-closing wedge which protrudes axially into the at least one segment.

5. The rotor according to claim 2, wherein the rotor main body is overmolded or cast with plastics in order to form a casing, and wherein the structure is configured on the casing.

6. The rotor according to claim 1, wherein, in the region of the at least one segment, at least a portion of the potting body is configured to be thin such that a predetermined breaking point is formed.

7. The rotor according to claim 1, wherein a predetermined breaking point is formed via a cover element arranged on the front side on the rotor.

8. A method for producing a rotor, comprising:
   providing a rotor main body, comprising:
      a plurality of rotor teeth distributed around the circumference; and
      rotor slots formed therebetween;
   winding the rotor teeth with conductor material in order to form a winding;
   applying potting compound onto the conductor material in order to form a potting body for the mechanical stabilization of the winding, wherein the potting body forms segments on the front side in the extension of the rotor slots;
   in at least one of the segments, eliminating a material cohesion of the potting compound by introducing a structure which brings about a cracking of the potting compound.

9. The method according to claim 8, wherein the cracking takes place during at least one of a cooling of the potting compound or during operation of the rotor.

* * * * *